United States Patent
Khalemsky et al.

(10) Patent No.: US 6,887,368 B2
(45) Date of Patent: May 3, 2005

(54) METHOD AND DEVICE FOR ELECTROEXTRACTION OF HEAVY METALS FROM TECHNOLOGICAL SOLUTIONS AND WASTEWATER

(75) Inventors: Aron Mikhailovich Khalemsky, Yekaterinburg (RU); Sergei Abramovich Payusov, Yekaterinburg (RU); Leonid Kelner, Reston, VA (US); Jae Jo, Setauket, NY (US)

(73) Assignee: Ural Process Engineering Company, Ltd., Yekaterinburg (RU)

( * ) Notice: Subject to any disclaimer, the term of this patent is extended or adjusted under 35 U.S.C. 154(b) by 235 days.

(21) Appl. No.: 10/253,546

(22) Filed: Sep. 25, 2002

(65) Prior Publication Data

US 2004/0055964 A1 Mar. 25, 2004

(51) Int. Cl.⁷ .................................. C02F 1/461
(52) U.S. Cl. .................. 205/702; 205/744; 205/761; 205/771; 204/230.6; 204/230.7; 204/268; 204/269; 204/272
(58) Field of Search ................. 205/702, 744, 205/761, 771; 204/230.6, 230.7, 268, 269, 272

(56) References Cited

U.S. PATENT DOCUMENTS

| | | |
|---|---|---|
| 4,053,378 A | 10/1977 | Moeglich et al. |
| 4,690,741 A | 9/1987 | Walsh, III et al. |
| 4,908,109 A | 3/1990 | Wright |
| 4,915,846 A * | 4/1990 | Thomas et al. ............. 205/700 |
| 4,917,782 A | 4/1990 | Davies |
| 5,022,974 A | 6/1991 | Häivälä |
| 5,094,757 A | 3/1992 | Light |
| 5,108,563 A | 4/1992 | Cook |
| 6,077,416 A | 6/2000 | Khalemsky et al. |
| 6,267,871 B1 * | 7/2001 | Weakly et al. ............. 205/742 |
| 6,294,061 B1 | 9/2001 | Morkovsky et al. |

* cited by examiner

Primary Examiner—Arun S. Phasge
(74) Attorney, Agent, or Firm—Foley & Lardner LLP

(57) ABSTRACT

The basic principles of the method for heavy metals electroextraction from technological solutions and wastewater includes pretreating to remove Chromium-6 and high concentrations of heavy metals and periodically treating in a six-electrode bipolar cylindrical electroreactor made of nonconducting material to achieve lower accepted levels of impurities. Six cylindrical steel electrodes form two triode stacks and are fed with three-phase alternating current of commercial frequency (50–60 Hz), which can be pulsed. Each phase of the three-phase current is connected to three electrodes of one triode stack or in parallel to two triode stacks. The parallel connection of three-phase current to two triode stacks is performed so that the same phase of the three phase current is connected in parallel with each two opposite electrodes of six electrodes located along the periphery, or with two adjacent electrodes. A bipolar stationary aluminum electrode is situated in the inter-electrode space. In one of the embodiments, the bipolar electrode is made of a perforated heat-resistant plastic container filled with secondary aluminum and duralumin scrap. In another embodiment, the bipolar electrode of aluminum or duralumin scrap may be made without a perforated container and is placed in the inter-electrode space as a bulk scrap. In this case, to prevent shorts, each of six steel electrodes is placed in isolated perforated plastic shell with holes of 5 mm in diameter. Non-ferrous metals are extracted in a form of ferrite-chromites, and aluminates as well as hydroxyl salts deposited in the inter-electrode space without electrolysis deposits on electrodes. Deposits are separated from solution by known methods of filtration.

40 Claims, 7 Drawing Sheets

METHOD AND DEVICE FOR ELECTROEXTRACTION OF HEAVY METALS FROM TECHNOLOGICAL SOLUTIONS AND WASTEWATER

This invention was made with Government support under Contract No. DE-AC02-98CH10886 awarded by the U.S. Department of Energy. The Government has certain rights in this invention.

CROSS-REFERENCE TO RELATED PATENT APPLICATIONS

BACKGROUND OF THE INVENTION

1. Field of the Invention

The invention is mainly related to processes of industrial wastewater purification and in particular, to electrochemical processes of their treatment for removal of heavy metals, such as Fe, $Cr^6$, $Cr^3$, Cu, Zn, Cd and others. This wastewater is produced by enterprises using chromium compounds, non-ferrous metallurgy and electro galvanic coatings.

2. Description of the Prior Art

Methods for wastewater purification from chromium ($Cr^3$ or $Cr^6$— trivalent or hexavalent) and other heavy metals are well known, but many of those methods are not suitable for purification of large volumes of wastewater (millions of cubic meters per year).

These limitations of existing methods (such as ion exchange, membrane technologies, including ultrafiltration, reversed osmosis, chemical coagulation, coagulation with DC current, etc.) include:

a) low capacity of devices with periodic operation, when it is necessary to retain water in the reaction zone for sufficiently long period of time, b) difficulties in fabrication and operation of these devices with dimensions over 100 $m^3$, c) high cost of needed reagents, for example, in ion-exchange technology, d) extreme complexity of some methods, making them technologically vulnerable to provide continuity and trouble-free operation, for example in membrane ultrafiltration technology.

Chemical methods of wastewater purification are not applicable today due to difficulty in reusing purified water in technological processes. Typically, conventional water purification methods provide utilization of sludge extracted from this water.

A large number of electrocoagulation methods and devices are known for wastewater purification from chromium and heavy metals. They use direct current with a current density on electrodes not less than 2.5/$dm^2$ in fixed electrolytic cells, which work periodically (see e.g., U.S. Pat. No. 4,908,109, U.S. Pat. No. 4,917,782, U.S. Pat. No. 5,022,974, U.S. Pat. No. 5,094,757, U.S. Pat. No. 5,108,563, and U.S. Pat. No. 6,294,061.

Application of direct current during wastewater electrocoagulation has several disadvantages. These include:

1. Necessary application of powerful rectifying devices and big loss of current due to rectifying.

2. The application of direct current in multielectrode stacks usually with small inter-electrode distance (10 mm) leads to uneven wear of the electrodes. Typically, the anode material dissolves and electroreduction products stick to the cathodes. This results in frequent short circuits requiring emergency downtime for changing the electrode stacks or transforming of partly worked stacks into secondary scrap. Uneven wear of electrodes during application of direct current makes these methods of metal electro-coagulation from wastewater not practical even for small galvanic plants.

To avoid sticking of electroreduction products to the cathodes, two previous patents suggest the use of cathodes with mobile electrodes or switching their polarity (U.S. Pat. No. 4,908,109 and U.S. Pat. No. 4,917,782). However, the problems of switching frequency are not resolved to make these methods practically feasible.

Electrocoagulation methods and devices are known for purification mostly from organic impurities, dyes and oils. Typically, the methods use alternating current or alternating current superimposed over direct current (U.S. Pat. No. 4,053,378 and U.S. Pat. No. 4,690,741).

Application of alternating current eliminates uneven wear (dissolution) of electrodes, typical for methods and devices for electrocoagulation based on the direct current. However, these methods have disadvantages caused by process periodicity and small volume of treated solutions, which impedes purification of wastewater by continuous flow.

Another disadvantage of the known methods is the use of noncommercial frequencies, i.e. variation of frequency changes with electrocoagulation period or application of high frequencies (z) with changing amplitude of positive and negative voltage impulses of different duration and form.

As a result, special frequency generators are needed for the above methods. Additionally, application of electrocoagulation devices with periodic operation for large volumes of water as well as for solution purification in continuous flow is unknown. The application of frequency generators for such electrocoagulation devices does not improve the technical and commercial effectiveness of electrocoagulation with respect to the application of rectifiers in electrocoagulation with direct current. This is due to a commensurable loss of electrical power in rectification and for the generation of different asymmetrical frequencies.

A method utilizing an electrocoagulator for wastewater purification from heavy metals is described in U.S. Pat. No. 6,077,416. According to this method, solutions are treated in an electroreactor, containing non-movable and movable electrodes with application of three-phase alternating current. The basic design of the device of this method is in the placement of movable electrodes (made of aluminum scrap pieces or shavings) in a perforated plastic container. A movable electrode is placed in the inter-electrode space formed by fixed steel electrodes, which are fed with two phases of three-phased current. The aluminum electrode is grounded and moves in the inter-electrode space between steel electrodes.

An electroreactor of any design based on a combination of steel stationary electrodes and movable aluminum electrode is filled with initial solution to be purified of heavy metals and organic impurities. A two-phase power supply is used to provide power to stationary steel electrodes. Due to the bipolarity of the movable aluminum electrode, a voltage appears between this electrode and steel electrodes. A voltage drop per cm of inter-electrode space is determined by the value of voltage applied to the steel electrodes and the distance between electrodes. The process of solution electrotreatment in the electroreactor is performed up to the moment, when a test sample shows that the separated contaminant (a heavy metal or organic compound) concentration level is below the level required by a standard or regulation. Then the treated solution is transferred to a separation filter for water clearance.

Steel electrodes are placed horizontally strictly facing one another in rectangular electroreactors. In a cylindrical reactor, all peripheral steel electrodes are also oriented in parallel relative to a sectional view of the central steel electrode.

Power supply for steel electrodes, i.e., voltage drop between central and peripheral electrodes, is the same. Therefore, all peripheral electrodes are connected in parallel to the same current phase. For the electrocoagulation process, any two phases for three-phased current are used at the same time: either 1–2, or 2–3, or 1–3. All three phases are used primarily for providing power to 3-phase pumps and engines.

The application of two phases of alternating current has one major disadvantage—only partial utilization of three-phase power supply for electroreactor. As a result—the purification process has unproductive loss of power resulting in decreased device efficiency due to imperfect electric power utilization.

SUMMARY OF THE INVENTION

The main objective of this invention is a method for continuous extraction of heavy metals from wastewater and technological solutions. The method can handle low (approximately 0.1 mg/L to approximately 1.0 g/L) and medium concentration (approximately 1.0 g/L to approximately 5.0 g/L) of heavy metals contamination. When high concentrations (approximately 1.0 g/L) of heavy metals are present, specifically when Cr-6 is in the treated solution, the level of heavy metals should be reduced by other less energy consuming methods, such as cementation in a labyrinth. The invented method allows treating large volumes of wastewater due to an increased rate of heavy metals extraction using the proposed method. This is possible by applying higher voltage (U) and current to the solution by utilizing all three phases of alternating current on specially designed electrodes during the electrocoagulation process. This allows varying electrical current over a wide range and allows finding optimal conditions for treatment without substantial loss of electrical power on electrodes or in the power supply.

Another objective of this invention is to create a device for electroextraction of heavy metals that is capable of treating large volumes of wastewater without substantial losses of electric power. This leads to smaller treatment units capable of operating for longer time then 2-phase based units.

To address these objectives using the method of electroextraction of heavy metals from wastewater and technological solutions, including solutions treatment in an electroreactor with alternating three-phase current of commercial frequency, according to the invention, the treated solution is preliminarily treated to remove chromium-6 and to reduce higher concentrations of heavy metals (if necessary). Then the wastewater is passed periodically through a six-electrode bipolar electroreactor, containing two three-electrode stacks connected to a 3-phase electrical current supply.

Another objective of this invention is a device including a bipolar electroreactor made of nonconductive material with fixed steel electrodes connected to a three-phase current source and a bipolar aluminum electrode located in the inter-electrode space. According to the invention, six steel electrodes form two three-electrode stacks with possibility to switch electrodes of each stack to all three phases of alternating current. The bipolar aluminum electrode is stationary. In one of the embodiments, this electrode is designed as a removable perforated container filled with aluminum and/or duralumin scrap. Another embodiment of the bipolar electrode design is when aluminum or duralumin scrap is placed directly in the inter-electrode space as a bulk scrap (without perforated container). To avoid electrical shorting, each of steel electrodes is coaxially placed in an isolated perforated shell (made of non-conducting material, such as plastic, ceramics, insulating composite, etc.) with holes not more than 5 mm in diameter. Distances between electrodes and isolating shells are 10–20 mm.

Steel fixed electrodes are evenly located along the periphery inside of an electroreactor at an interval of not less than 40 mm from its wall and are made of secondary pipes or all-metal cylindrical and other secondary products, for example, rails, T-beams.

The electroreactor has cylindrical form with a conic bottom and an outlet pipe made of nonconductive material—for example, composite material ("textolite™"), heat-resistant fiberglass plastic, concrete, bricks. Other materials may also be used.

The perforated container and insulating shells of the steel electrodes are made of nonconductive heat-resistant plastic with holes not more than 5 mm in diameter. The perforated container is filled with aluminum and duralumin scrap not less than 10 mm in size and is located at a distance not less than approximately 40 mm from steel electrodes.

Three-phase current is connected to one triode stack or in parallel to two triode stacks. In the latter case, three phases of the three-phase current are connected in parallel to each of two opposite electrodes.

Thus, all six electrodes are switched to 3 different phases of the three-phase current forming two crossed triangles, inscribed in the inner cylinder of the electroreactor. Steel electrodes are located in the corners of the triangles. Zero phase is not used (unlike in previous designs). The voltage applied to all three phases (2 triangles) is constant and amounts to a current-carrying value used by a customer (preferably the main voltage supply is 480V, or smaller in case of small volume of purified solutions and small sizes of electroreactors).

It is also possible to connect each phase of the three-phase current in parallel to each of two side by side (adjacent) electrodes in order to increase sectional area of steel electrodes, for example, if it is necessary to increase total current through the electroreactor solution.

The Bipolar electrode is not grounded and is not connected to any phase of the three-phase alternating current.

Switching different phases to six electrodes creates very complex configuration of electric fields crossing the internal volume of the device in different directions. This is unlike the previously patented device (see U.S. Pat. No. 6,077,416), where the electric field has one direction from the steel fixed electrodes to the movable aluminum electrode. Intersecting of electric fields from different phase electrodes as well as high voltage of three-phase current generates in the solution "impact" (shock) electric currents of large forth. This results in a high rate of a solution purification from heavy metals and organic compounds. Purification with such "impact" power supply lasts several minutes compared to 1–1.5 hours of purification time of the previous design (see U.S. Pat. No. 6,077,416).

Thus, the main advantage of this invention is the significant improvement of rate of treatment of wastewater. It leads to downsizing of cleaning units and increase in the number of operating cycles before maintenance. Application of large initial currents in the treated solution does not lead to increase in power consumption (for purification of 1 $m^3$ of solution). On the contrary, some decrease of power consumption is observed due to lower heat diffusion of solution because the time needed for treatment is significantly reduced.

Losses of electric power are decreased further since the three-electrode steel system having bipolar electrode made of aluminum or duralumin scrap continues to extract heavy metals from solutions even after electric power is switched off.

BRIEF DESCRIPTION OF THE DRAWINGS

The foregoing and other features, aspects and advantages of the present invention will become apparent from the following description, appended claims and the exemplary embodiments shown in the drawings, which are briefly described below. It should be noted that unless otherwise specified like elements have the same reference numbers.

DETAILED DESCRIPTION OF THE PREFERRED EMBODIMENTS

Heavy metals are extracted in the form of ferrite-chromites, and aluminates as well as hydroxy salts, generated, when solutions are put into three-phase alternating electric field of commercial frequency and voltage with changing current strength in different directions of solution volume.

Figure 2:
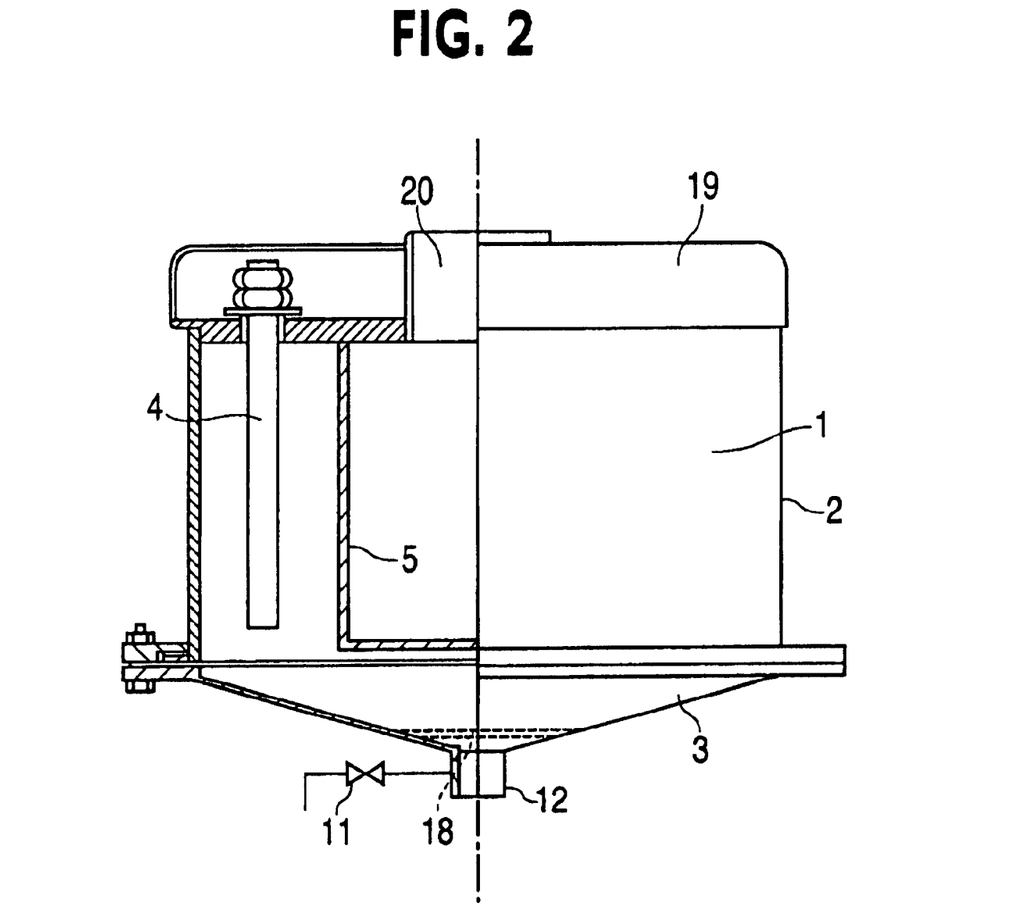
FIG. 2 shows a device for electroextraction of heavy metals from technological solutions and wastewater; general view.
Figure 3:
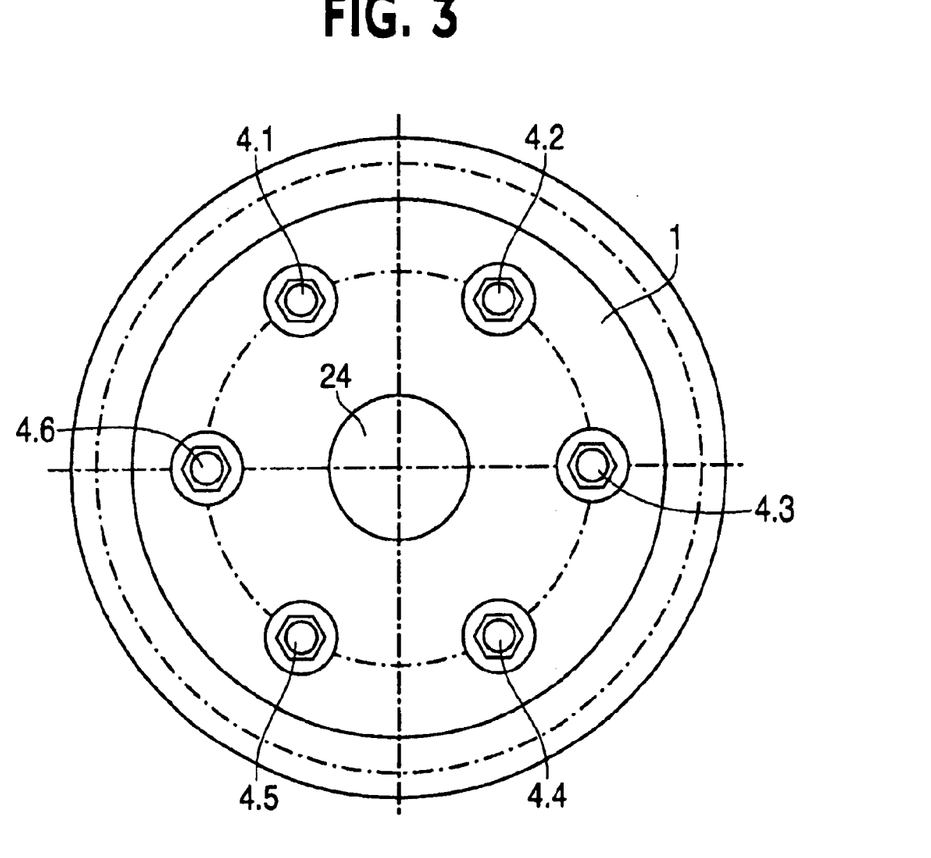
FIG. 3 is a cross-sectional of the device of FIG. 2 through A—A.

The method is realized in a device containing cylindrical electroreactor 1, in which the housing 2 is made of non-conductive material with conic bottom (FIG. 2). For a nonconductive material, the following can be used: heat-resistant fiberglass plastic, concrete and bricks. Other non-conductive materials may also be used. Six steel cylindrical electrodes 4 are placed along the periphery of the electroreactor 1 along its inner side. A bipolar aluminum electrode 24 is located in their inter-electrode space in the center (FIG. 3). The fixed steel electrodes 4 are placed in the corners of two crossed triangles 21, 2 (FIG. 4) so that each two opposite electrodes 14.1–4.4, 4.2–4.5, 4.3–4.6) are connected to the same phase of three-phase current. Thus, in this embodiment, there are two three-electrode stacks 4.1/4.2/4.3 and 4.4/4.5/4.6.

Figure 4:
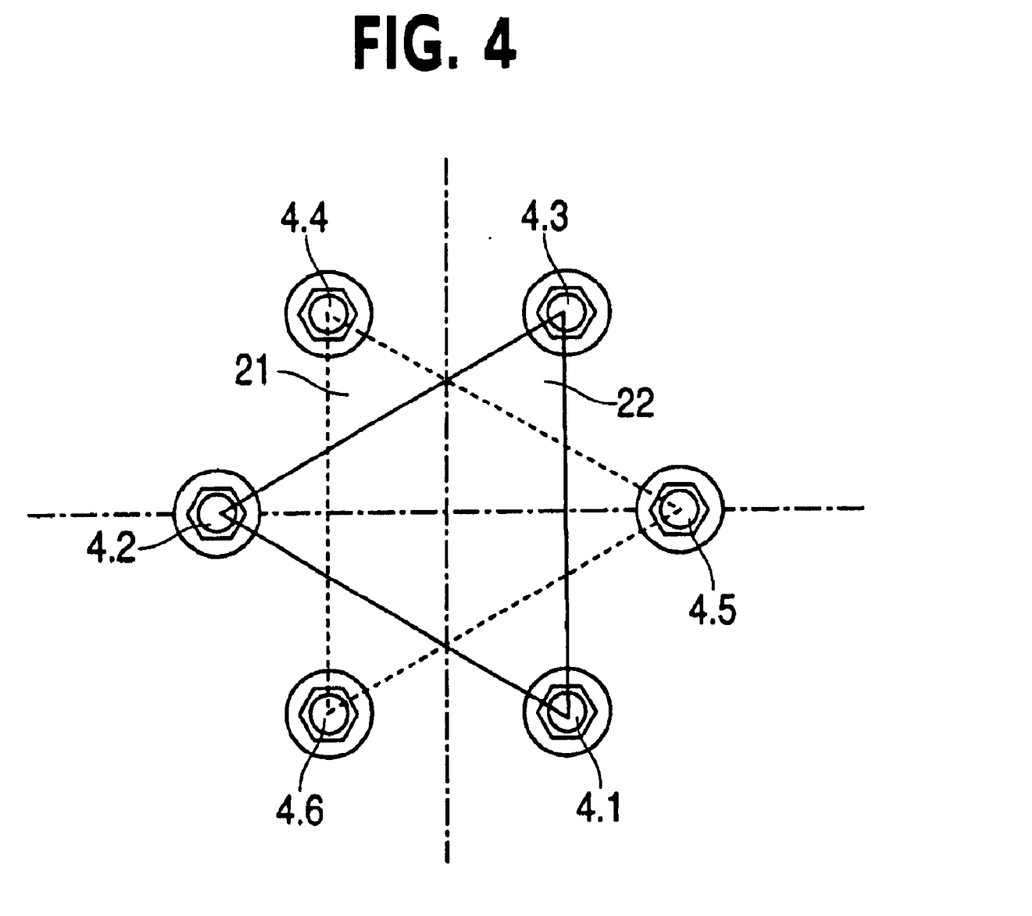
FIG. 4 shows a symbolic notation for describing an electrode stack with three-phase switching.

Depending on volume of treated solutions and their conductivity varying from 1 to 4 S/cm, the electrodes cross-section diameter is in the range from 20 to 180 mm. In another embodiment of the invention, the electrodes can be connected to power supply unit 10 in a different way than discussed above. In this embodiment, the same phase is connected to two opposite electrodes. For example, if it is necessary to increase the line current through the electroreactor solution, it is logical to increase the cross-sectional area of steel electrodes. In this case, it is possible to connect adjacent electrodes in pairs, i.e. 4.1–4.2; 4.3–4.4; 4.5–4.6 to the same phase (FIG. 3 and FIG. 4). On the contrary, if it is necessary to decrease current consumption, one of the triangles, 21, 22 (FIG. 4) may be disconnected and only one is used.

Figure 1:
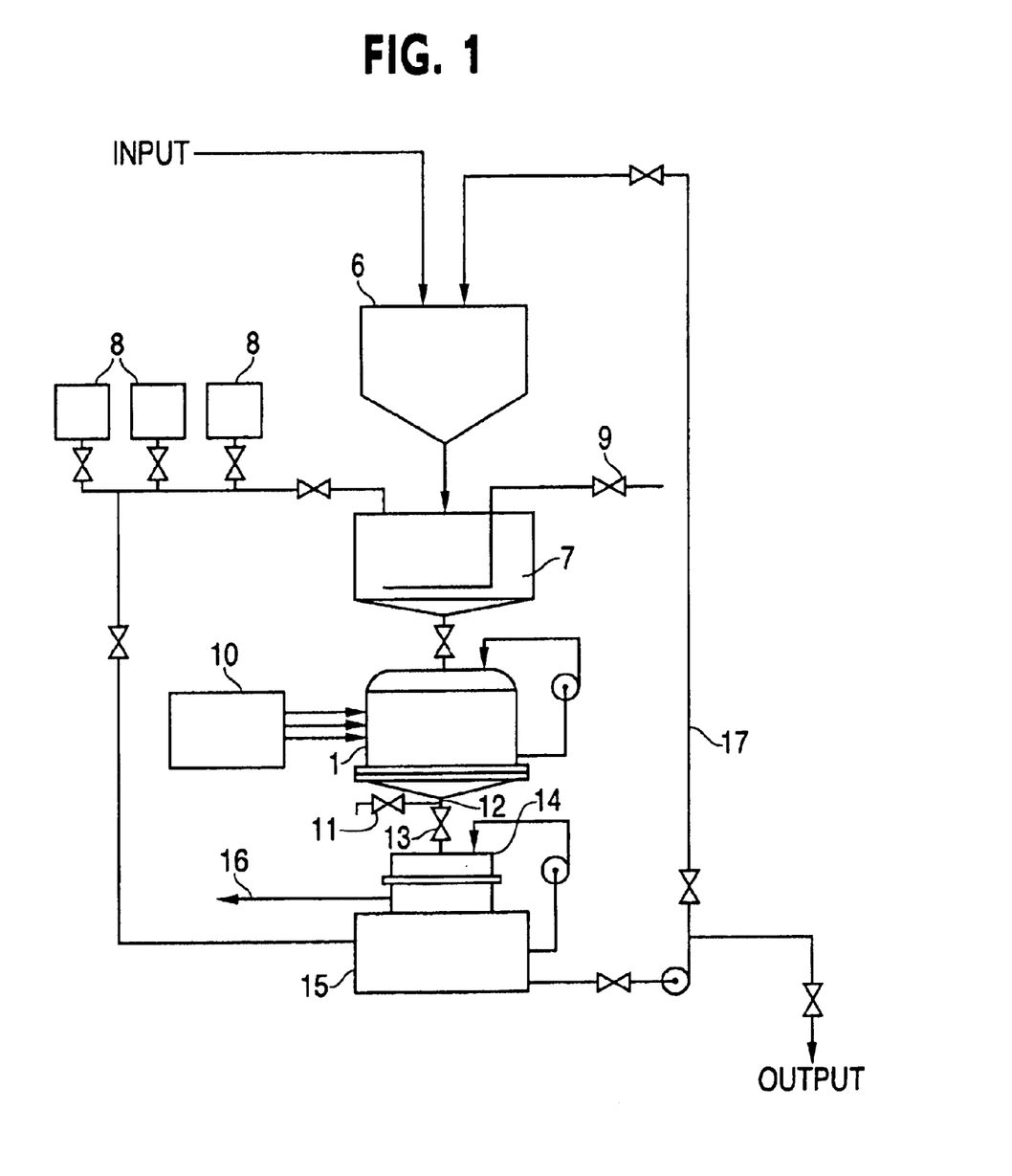
FIG. 1 is a schematic illustration which describes method for electroextraction of heavy metals from technological solutions and wastewater.

Wastewater (or semi-industrial solutions) purified from heavy metals are transferred to a receiving tank 7 through a funnel 6 (FIG. 1). Reagents for pH adjustment (preferably, the pH is in the range between 7 and 8) are contained in reservoirs 8 and are delivered to the same receiving tank 7. Compressed air, controlled by valve 9, is used to mix the solution. After normalization of the pH in the receiving tank 7, the solution is pumped into the electrocoagulator 1.

After the electrocoagulator 1 is filled to the desired volume, the three-phase current power is turned on at the control panel of the power supply unit 10. In some cases, it is recommended to use current interruption (pulsing). This is accomplished through the use of a pulse current controller. The pulse duration is preferably between 0.1 and 10 seconds while the interval between pulses preferably of the same length as the pulse. However, the time between pulses may be longer or shorter than the duration of the pulse. Example pulse durations include, but are not limited to, ½, ⅙, $\frac{1}{12}$ and $\frac{1}{36}$ seconds. The use of the pulse current controller allows the conduction of the electrocoagulation process at a much higher level of electrical current then normally would be permitted at the dimensional designs of the electrocoagulator (150–350 A at 220–480 V). The power consumption for purification of 1 m$^3$ of solution can be reduced at least by a factor of 2 if the duration of the impulses and interruptions are equal.

The duration of the electrical treatment of solutions (wastewater) in the electrocoagulator 1 to remove heavy metals and to partly remove organic compounds (low volatile), for example, oils and dyes, typically is 2–10 minutes, depending on the solution volume. In the presence of organic phases in the solution, foam is generated which rises to the top of the electroreactor at the end of electrical treatment. The process is stopped when the solution temperature reaches nearly 100° C.

The process of solution treatment and purification from heavy metals is controlled by sampling through the valve 11 (FIG. 1) from a side pipe of the drain valve 12. Before analysis, samples are filtrated. As the aluminum is used up in the electroreactor, the inter-electrode space (in container 5, FIG. 2) is replenished with new portions of aluminum scrap. Previous portions of aluminum sink to the electroreactor bottom giving place for new loading. Aluminum (duralumin) is used up completely during the process of solutions purification from heavy metals.

At the end of the treatment process the electroreactor 1 is emptied of sludge through latch 13. The sludge is transferred for filtration, preferably through a vacuum-filter 14 (FIG. 1), and further to the intermediate storage tank 15. Filtrated deposits 16 from the surface of the filter 14—aluminates, ferrites, hydroxides and hydroxyl salts of heavy metals—are transferred for treatment as a by-product for ferrous and nonferrous metallurgy, as well as to chemical industry. Purified water 17 is used again in the primary production or goes to an intermediate reservoir, containing bacteria, that reprocess the salt content of alkaline and alkaline earth metals and acid anions (sodium, $SO_4^{2-}$, $NO_3^{1-}$, potassium, calcium, etc.).

If an organic phase is present in the purified solutions, for example, dyes, it is often necessary to oxidize or clear solutions after filtration 14. For this purpose, canisters 8 should have appropriate oxidizers: ozone, oxygen, hydroxyperoxides, pyrolusites, sodium ferrites, etc. In this embodiment, canisters 8 with oxidizers are connected not only to a receiving tank 7, but also to a storage unit 15, which has a mixing device (not shown). If oxidizing of organic phase is accompanied by extra sedimentation, solution with the deposit is again returned from tank 15 to filter 14.

The device design does not have to follow exactly the design as per FIG. 1. Units 1–15 can be placed, for example, horizontally, i.e. at the same level, or any other way. In this embodiment, transportation of solution between system components can be accomplished by utilizing pumps.

The design of the electrocoagulator 1 is illustrated in detail in FIGS. 2–7. The Electrocoagulator is a cylinder with housing 2 and bottom 3. Preferably, the housing 2 is made of fiberglass plastic, or other plastic material with structural integrity stable at temperatures up to 120° C. Bricks or concrete can also be used.

Along the perimeter of the inner wall six movable steel cylindrical electrodes 4 (4.1, 4.2, 4.3, 4.4, 4.5, 4.6) are placed not closer than approximately 40 mm from the wall. It is possible to make them from secondary pipes or all-metal cylindrical and other secondary products, for example, rails, T-beams.

In one of the embodiments (FIG. 2, 3), the plastic heat-resistant container 5 is located in the inter-electrode space at the interval not less than approximately 40 mm from electrodes 4, along the whole depth of electroreactor 1 to the conic bottom 3. Preferably, the container 5 is perforated with holes 5 to 7 mm in diameter. The container may be filled with aluminum or duralumin scrap. Preferably, the size of the pieces is not less than approximately 5 mm and up to approximately 20 mm.

Figure 5:
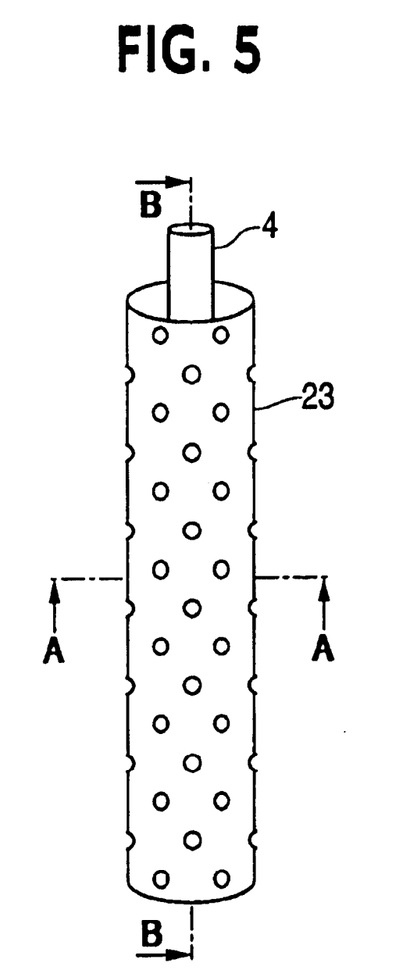
FIG. 5 illustrates a steel electrode in a isolated shell.
Figure 6:
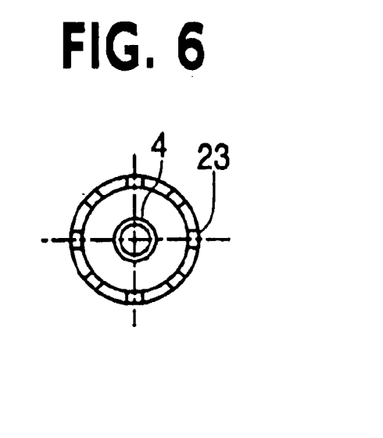
FIG. 6 is a cross-sectional of the electrode of FIG. 5 through A—A.
Figure 7:
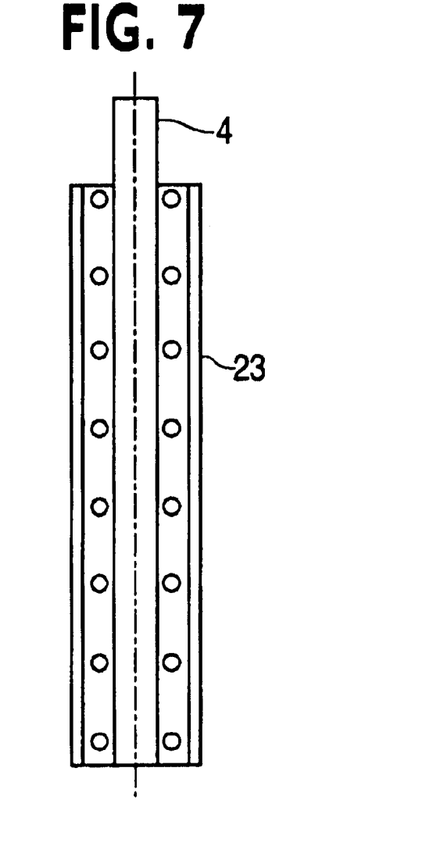
FIG. 7 is a cross-sectional of the electrode of FIG. 5 through B—B.

In another embodiment of the device, the bipolar electrode of aluminum or duralumin scrap can be made without perforated container 5 and placed in the inter-electrode space as a bulk scrap. In this embodiment, to avoid electrical short circuits, each of six steel electrodes 4 is placed in an isolated perforated plastic pipe housing 23 having holes not more than approximately 5 mm in diameter (FIG. 5-7). Preferably, the space between the electrode 4 and the insulating housing (pipe) 23 is between approximately 10 mm and approximately 20 mm.

The lower part of the electroreactor—bottom 3— is made in a form of a cone. In the center of the cone, there is a socket 12 for removal of residual sludge containing heavy metals, iron and aluminum, which substitute extracted (cemented) heavy metals. Socket 12 is supplied with outlet pipe 11 for sampling during control of solution purification efficiency. Steel basket 18 with holes not more than approximately 3 mm in diameter is placed inside over the socket to prevent residual aluminum pieces from being transferred into the pumping device (FIG. 1).

In addition to electrodes 4 and container 5, the electroreactor may include a sensor of industrial pH-meter (pH range between 2 and 10), a temperature sensor (to approximately 110° C.), and a bubbler pipe with compressed air in the inter-electrode space of the electroreactor. The electroreactor 1 is also supplied with a level meter for volume control of poured and treated wastewater. The above control devices are not shown on FIG. 1-3.

The electroreactor is supplied with insulating cover 19 having all necessary holes for connecting electrodes 4 to power supply, unit 10 (FIG. 1) as well as for connecting various control sensors (pH, T°, bubbler, circulation piping, level meter). An inspection window 20 is included in the cover 19. The diameter and height of electroreactor are calculated according to necessary productivity of initial water neutralization (purification) from heavy metals, including chromium-3, copper, zinc, nickel, tin, etc., except manganese-2. It is possible to get rid of manganese-2, if the solution pH is raised up to pH≅10. The calculations are based on using the voltage drop in the inter-electrode space. Preferably, the voltage drop should be not less than 3.1 V per cm of path and the current density per 1 $cm^2$ of any steel electrode cross-section dimension should be not less than $0.027/cm^2$. Electroreactor dimensions and numbers needed for treatment are calculated using not only the required volume of treated water, but also taking into account the voltage and current availability at the customer's site.

For successful extraction of heavy metals within the range of several minutes (2–10) it is necessary to take into consideration the fact that the voltage drop per 1 cm of inter-electrode intervals 4.14.2; 4.1–4.6; 4.2–4.3, etc. (FIG. 3.4) should be not less than approximately 3.1 V/cm. Current density on any steel electrode cross-section should not be less then approximately $270/m^2$. Based on these data and availability of maximum electrical main power supply, the dimensions of each electroreactor and their required numbers can be calculated.

Six electrodes are connected to the power supply 10 (FIG. 1) in such a way, that only 3 electrodes (4.1, 4.3, 4.5 & 4.2, 4, 4, 4.6) are powered by a three-phase current in parallel. Consequently, the six-electrode system on FIG. 3, 4 represents two inverted intersecting triangles 21, 22. Here the same phase of the three-phase current is connected with the electrode opposite to each other electrode, i.e. according to FIG. 3, 4 the same phases are connected to electrodes 4.1–4.4; 4.2–4.5; 4.3–4.6. This does not exclude other ways of connection. If necessary, it is possible, for example, to connect the same phase of the three-phase current to adjacent electrodes: 4.1–4.2, 4.34.4, 4.5–4.6. With such connection, current strength increase is possible in the inter-electrode space between opposite pairs of electrodes. If the current strength obtained in an electroreactor with six electrodes is too large, it may be lowered, when necessary, connecting three-phase current only to three electrodes of a one triangle.

A bipolar aluminum electrode is located in the inter-electrode space. According to the invention, six steel electrodes form two three-electrode stacks with possibility to switch electrodes of each stack to all three phases of alternating current. Aluminum or duralumin scrap located in a container (or as a bulk scrap) in the inter-electrode space plays the role of the bipolar electrode, on which the extraction of heavy metals with negative redox potential, such as $Cr^3$, $Zn^{2+}$, $Ni^{2+}$, $Cd^{2+}$, etc., i.e. approaching by sign and value to aluminum, is taking place. Extraction of metals with E>0 (electropositive) like copper is provided mostly by steel active electrodes.

Figure 8:
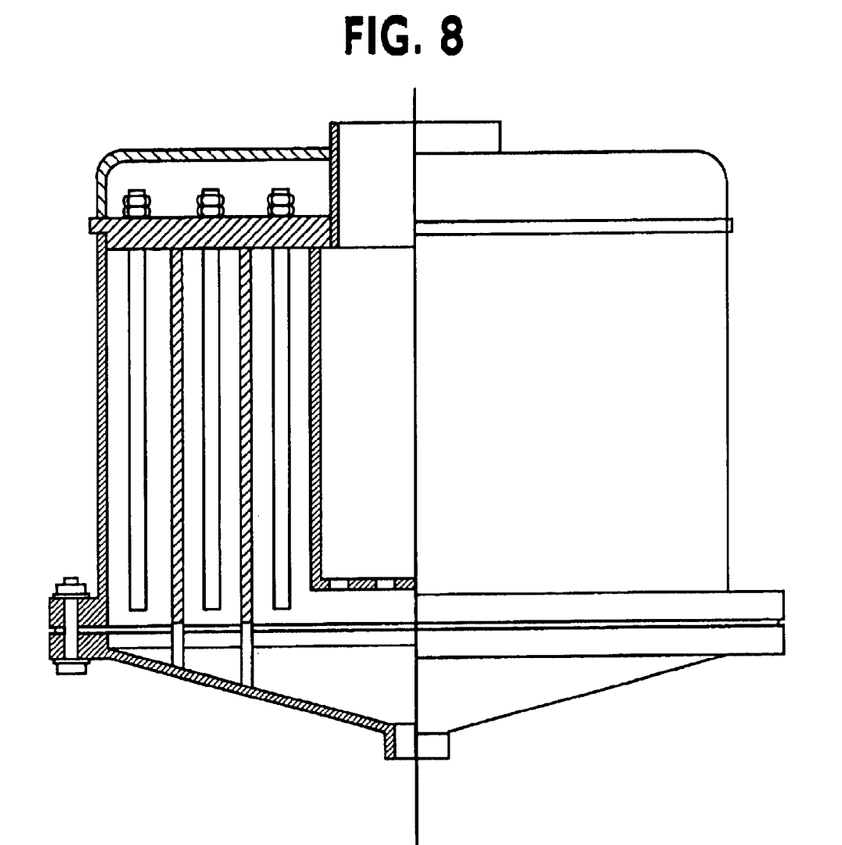
FIG. 8 shows a second device for electroextraction of heavy metals from technological solutions and wastewater; general view.
Figure 9:
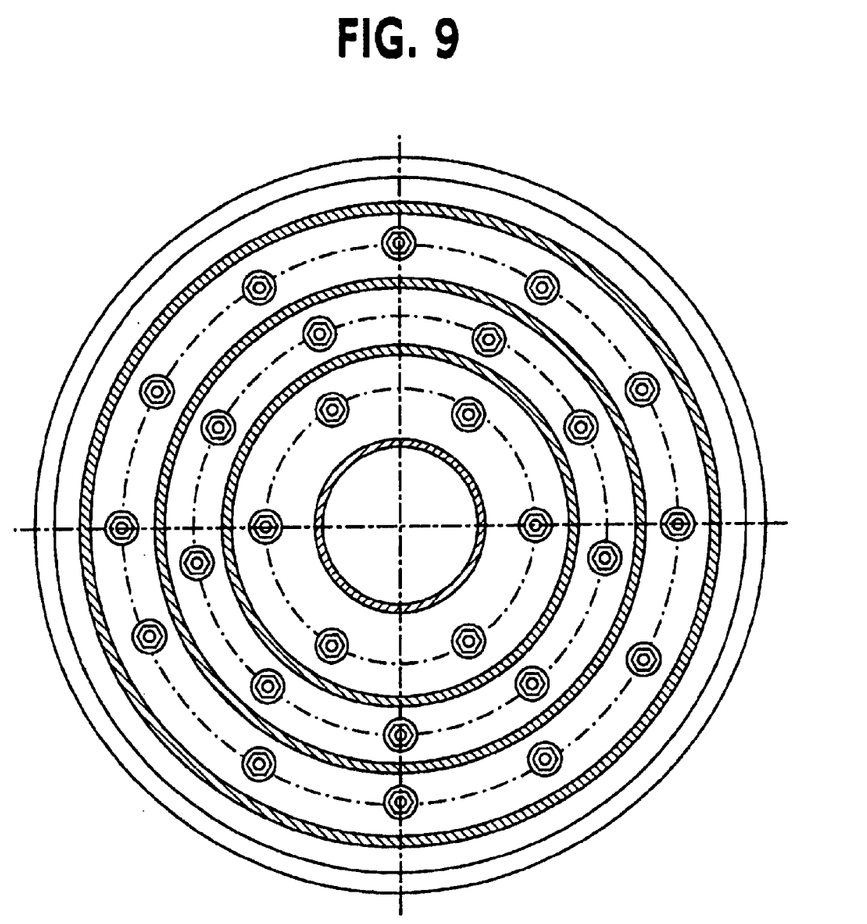
FIG. 9 is a cross-sectional of the electroextraction device of FIG. 8 through A—A.

Another embodiment of the invention is illustrated in FIGS. 8 and 9. In this embodiment, the electroreactor has a plurality of concentric channels. Located around the periphery of each of the channels are steel electrodes. As in the previous embodiments, the electrodes are configured to operate in three-electrode stacks. In the preferred aspect of this embodiment of the invention, the outer channels have more electrodes than the inner channels. However, the outer channels may have the same number or fewer electrodes. In addition, the electroreactor according to this embodiment of the invention may have any number of channels (FIGS. 8 and 9 illustrate an electroreactor with three channels). Further, each stack in the multi-channel electroreactor may be switched on or off independently from the other electrode stacks.

Technology

The basis for the method and device of this invention is in the utilization of the differences in values of redox potentials necessary for reduction of different metal ions into metallic form, i.e.

$$Me(OH)_3 \xrightarrow{+3e} Me; \quad Me = Al, Cr, Fe^{3+},$$

$$Me(OH)_2 \xrightarrow{2e} Me; \quad Me = Mg, Zn, Cu, Cd, Co, Fe^{2+}, Ni.$$

The redox potentials of selected elements are shown in table 1.

TABLE 1

Normal redox potentials ($E_{0,v}$)

| Electron transition | $E_{0,v}$ |
|---|---|
| $K^+/K$ | −2.925 |
| $Ca^{2+}/Ca$ | −2.87 |
| $Na^+/Na$ | −2.713 |
| $Mg^{2+}/Mg$ | −2.37 |
| $Al^{3+}/Al$ | −1.66 |
| $Mn^{2+}/Mn$ | −1.19 |
| $HsnO_2^- + H_2O/Sn$ | −0.91 |
| $SiO_2 + 4H^+/Si$ | −0.86 |
| $Zn^{2+}/Zn$ | −0.763 |
| $SO_4^{2-} + 4H_2O/S$ | −0.75 |
| $Cr^{3+}/Cr$ | −0.74 |
| $AsO_2^- + 2H_2O/As$ | −0.68 |
| $SbO_2^- + 2H_2O/Sb$ | −0.675 |
| $Fe^{2+}/Fe$ | −0.44 |
| $Cd^{2+}/Cd$ | −0.402 |
| $Ni^{2+}/Ni$ | −0.23 |
| $Sn^{2+}/Sn$ | −0.140 |
| $Pb^{2+}/Pb$ | −0.126 |
| $CrO_4^{2+} + 4H_2O/Cr(OH)_3$ | −0.13 |
| $Fe^{3+}/Fe$ | −0.036 |
| $2H^+/H_2$ | 0.0 |
| $Cu^2/Cu$ | +0.337 |
| $SO_4^{2-} + 8H^+/S$ | +0.36 |
| $½Cr_2O_7^{2-} \pm 14H^+/Cr^{3+}$ | +0.66 |
| $Hg^{2+}/Hg$ | +0.85 |

Most of the wastewater to be purified before secondary utilization or discharge into the environment contains metals, shown in Table 1 by their Redox potentials. Other metals, as a rule, are present in wastewater (in dissolved form) either in immeasurably small amounts, or they have Redox potentials values in the range from Zn to Cu. Thus, electrochemical extraction of Zn & Cu will be always accompanied by simultaneous extraction of these metals (not in Table 1), for example, Mo, V, W, co-precipitated with Cu & Zn during electrochemical treatment of solutions containing them.

According to series of Redox potentials shown in Table 1, it should be expected that each previous element in metal form will displace the next one in ion form into hydroxide under not very low pH>3. For example, metallic aluminum will displace iron-2 from its sulfate solutions, and metallic iron will displace copper-2 from solutions of its salts:

$$Fe_2(SO_4)_3 + Al = Fe \downarrow + Al_2(SO_4)_3; \quad (1)$$

$$CuCl_2 + Fe = Cu \downarrow + FeCl_2 \quad (2)$$

All metals from Table 1 with $E_{o,v}<0$ will destroy dichromate ions facilitating transformation of chromium-6 into chromium-3 according to the following reaction:

$$Cr_2O_7^{2-} + Fe + H_2SO_2 \rightarrow Cr_2(SO_4)_3 + Fe_2(SO_4)_3 + H_2O \quad (3)$$

It is possible further to remove chromium-3 with the help of metallic aluminum.

If electric current is transmitted through such heterogeneous system with metals in solution, all the displacement processes of ions with smaller Redox potential by metals with larger Redox potential will be accelerated with current density increase on displacing metal electrodes.

If alternating current is used, numerous processes will take place on electrodes. The main one is reduction of displaced ions and dissolution of the electrode metal (their transition into ionic form). Alternating current also facilitates the break-up of molecular complexes, that have polar-dipole structure, for example, organic compounds.

As an example, assume that there is some sulfuric acidic solution containing all elements of table 1 in ion form, i.e. the heavy metals, except the lighter metals, such as Mg and Al. Solutions of sulfates of these heavy metals and $Cr_2O_7$ are preferable for analysis as most of wastewaters contain these metals. If we place aluminum electrodes (or its alloy with Mg—duralumin) into solution of such sulfates and apply alternating current to this solution, the cementation process of heavy metal ions will take place on electrodes according to the reaction:

$$Me^{2+} + Al(Mg) \rightarrow Me^o + Al^{3+}(Mg^{2+}). \quad (4)$$

Subatomic displaced metals formed due to alternating current are not extracted, however, as elemental metals, but form hydroxyl salts up to hydroxides, such as (MeOH) $SO_4$, [0001]] [Me(OH)$_2$]$_2SO_4$, MeOH and Me(OH)$_3$, where Me is any of heavy metals in ionic form $Me^{+3}$.

In this case free acid present in solutions is spent for interaction with subatomic metal. Because of that, the pH of the solutions will increase according to the period of this process. Aluminum and magnesium of duralumin bipolar electrodes do not generate sulfates in the ionic (dissolved) form by reactions (1;2), but are extracted in a form of hydroxy-sulfates of variable composition. In this case, pH increase leads further to hydrolysis of all sulfates in the initial ion form according to the following reaction:

Me $SO_4$+HOH →((MeOH)$_2$ $SO_4$+HOH→hydroxy-sulfates of variable composition (5)

i.e. with generation of the same hydroxy-sulfates

Thus, the result of such electrochemical treatment with the application of only aluminum and/or duralumin electrodes will be settling-out of rather volumetric flaky aquatic complexes of hydroxy-sulfates with the general formula, $$(Me^{2+})_x(O)^2 \cdot _y(H_2O)_z(OH)_u(Me^{3+})_v(SO_4)_p^{2-} \quad (6),$$

as products of co-precipitation of alumohydroxy-sulfates with hydroxy-sulfates of heavy metals, including chromium and iron. The co-precipitation process is accompanied by adsorption on the surface of highly-charged hydroxysulfates (due to $Al^{3+}$, $Cr^{3+}$ & $Fe^{3+}$) of dissolved heavy metal salts. They form a diffusion adsorption layer on this surface, oriented by its polar dipoles to the surface mainly with negative sulfate anions. By this reason, electrocoagulation based on alternating current leads to sulfur removal from solutions along with heavy metals extraction into sludge. The sludge is separated from solutions by ordinary filtration, for example on vacuum and/or gravel-sand filters.

In a proposed method according to one embodiment of the invention, a three phase alternating current is utilized. This assumes a triode electrolytic cell where steel cylindrical cores or secondary scrap of steel piping is used as main electrodes. An aluminum bipolar electrode is placed in the inter-electrode space in a form of a container filled with aluminum scrap or in a bulk form between steel insulated electrodes without container. Therefore, there is no cementation of $Cr^{3+}$ & $Zn^{2+}$ on the surface of steel electrodes, but there is going to be cementation of all metals, which follow iron in Table 1. This process is accompanied by extraction of $Fe^{2+}$ ions into solution by analogy with reaction (2). In this embodiment, the wastewater contains $Fe^{3+}$ and $Cr^{3+}$, which results in the formation of iron ferrites and chromites, $Fe_3O_4$ and $FeCr_2O_4$. These ferrites and chromites are unable to form aquatic complexes of hydrophobic sediments—a regular crystal structure with very low solubility. Together with large amounts of magnetite $Fe_3O_4$ and chromite deposit, there occurs co-crystallization of other metal ferrites and chromites with an oxidation state of 2+ with general formula $MeFe_2O_4$ & $MeCr_2O_4$, where Me are ions of heavy metals with oxidation state$^{2+}$: for example, Zn, Cu, Ni etc., as well as Mg and Ca. Zn and $Cr^3$ are cemented on the bipolar electrode, but formation of ferrites and chromites facilitates a primary shift of the hydroxysulfate formation reaction into aluminates of heavy metals, that also co-crystallize with ferrites and chromites. If in the initial purifying solutions iron ($Fe^{3+}$) is absent, then evidently, during electrocoagulation treatment solutions should be subjected to aeration or $Fe^{3+}$ salts should be added.

It should be noted that the heating energy when conducting coagulation in a wastewater solution is different from the energy consumed for heating of plain (tap) water. When alternating current is turned on and is passing through a wastewater solution, solutions containing dissolved conducting substances are heated faster than pure water. According to the Joule-Lenz law $$Q = I^2 Rt \text{ (w-hour)} \quad (7)$$

According to the law of solution heat absorption for $\Delta T = T_{fin} - T_{in}$, the required energy to heat a given mass of solution is, $$Q = mc\Delta T \quad (8)$$

Equations 7 and 8 become equal during current transmission through conducting liquid so, that $$I^2 Rt = mc\Delta T, \quad (19)$$

where 1—current strength,
R—solution resistance,
m—mass of solution,
t—time of electrical heating,
c—solution heat capacity,
$T_{in}$, $T_{fin}$-initial and final temperature of solution.

From equation (9) follows, that $$t = mc(T_{fin} - T_{in})/I^2 R, \quad (10)$$

where $I^2 R = IU$-electroreactor power.

From equation (10), it follows that with the application of the same power ($I^2 R = IU$) to ordinary water and wastewater solutions, one may heat solutions with higher conductivity (wastewater) to $\Delta T$ faster or with less electrical heating, than ordinary water. This is true if the heat capacity of the wastewater is lower than the heat capacity of ordinary water(C=4.18 J/gram).

Analysis of practical solutions of tanneries (chromium$^{3+}$), galvanic enterprises (chromium$^{+6}$), and etching of printed circuit boards (Cu) shows, in general, a heat capacity reduction to 1.5 J/gram. Due to this fact, their heating time to a specific temperature can be reduced by 1.5–2.5 times compared with the time to heat water under commensurable conditions.

Some examples of the current invention are described below, which, however, do not limit range of applications of this invention.

Example 1 (Table 2) Wastewater from a tannery was filled into a 12-liter electroreactor made according to FIGS. 2 and 3. The wastewater contained chromium$^{3+}$ as well as organic reagents and dyes for genuine leather treatment (Table 2).

TABLE 2

| No | Initial content of $Cr^{3+}$, mg/L | PH Initial | Temp. °C. Initial | Current strength, I initial, (A) | Time of treatment, min. | Current strength, I final, (A) | PH Final | Final content of chromium, mg/L |
|---|---|---|---|---|---|---|---|---|
| 1 | 85 | 3.6 | 30 | 52 | 1.25 | 60 | 5.5 | 3* |
| 3 | 25.5 | 3.4 | 31 | 35 | 3.8 | 20 | 7–8 | <1* |

*Data obtained using express analysis method with lower limit (sensitivity) of 1 mg/L.

The working voltage of the three-phase current was 380V. In this experiment only one triangle was powered (FIGS. 3 and 4), i.e. 3 electrodes out of 6. Before the electroreactor was switched on, 10 ml of ammonia water was added to the solution. This water contained 28% $NH_3$ for neutralization of excessive acid (with pH change from $pH_{initial}$ to $pH_{final}$ in Table 2). Electrical treatment process was finished when solution temperature became 100°. Due to presence of organic phase in the solution it generates foam, which rises to the top of the electroreactor. After cooling, the foam settles to the bottom as a sludge co-precipitated with chromium$^{3+}$.

Analysis of the final solutions represented in Table 2, as in all other examples, was conducted simultaneously by two independent laboratories. In all cases (examples 1–5) parallel independent tests showed results which are lower by 1–2 orders of magnitude then those showed in tables 2–7.

Example 2 (Table 3)

The subject of the test was wastewater from a tannery containing $Cr^{3+}$. Testing was conducted on a laboratory electrocoagulator with a capacity of 25 L. Steel pipes 34 mm in diameter and 830-mm in length were used as electrodes. Number of electrodes —6. The electrodes were placed into plastic perforated pipes. Voltage=380V. The electroconductivity of solution —2.3 μm/cm. Table 3 shows test results for wastewater from the tannery treated in the laboratory electrocoagulator.

TABLE 3

| Time, min | Current strength, A | Temperature, °C. | pH unit | Content of copper, mg/L |
|---|---|---|---|---|
| 0 | 100 | 60 | 7.31 | 4.8 |
| 2 | 45 | 95 | — | 0.34 |

Example 3

Subject of test—wastewater from a tannery containing $Cr^{3+}$ as in example 2, but with lower content of $Cr^{3+}$ and lower electrical conductivity.

The test was conducted with a laboratory electrocoagulator with a capacity 25 L. Steel pipes 34 mm in diameter and 830-mm in length were used as electrodes. Number of electrodes 3. The electrodes were placed into plastic perforated pipes. The inter-electrode distance (side of equilateral triangle) was 195 mm. Voltage —! 380V. Solution conductivity —2.1 μSm/cm, pH=7.74. Content of $Cr^{3+}$ after electrocoagulation decreased from 0.06 mg/L to 0.02 mg/L.

Example 4 (Tables 4, 5)

Subject of test—wastewater after etching of printed circuit boards. Initial water analysis is shown in table 4.

TABLE 4

| PH units | $Cu^{2+}$ | $Fe_{total}$ | Dry Residue | $Cl^-$ | $SO_4^{2-}$ | $Al^{3+}$ Mg/L | $NH_4^+$ | $Zn^{2+}$ | $Ni^{2+}$ | $Ag^+$ | $Ca^{2+}$ | $Mg^{2+}$ |
|---|---|---|---|---|---|---|---|---|---|---|---|---|
| 8.0–9.5 | 10–120 | Less than 0.1 | 1,000 1,500 | 300–500 | up to 200 | less than 0.01 | 50–1000 | Less than 0.01 | Not found | not found | 0.015 | 0.003 |

Tests were conducted on a laboratory electrocoagulator with capacity 25L. Steel pipes 34 mm in diameter and 830-mm in length were used as electrodes. Number of electrodes —6. Electrodes were placed into plastic perforated pipes. Voltage=380V, duration of electrocoagulation —7 min. until temperature reached 85° C. The current was changed from 36A to 53A. The pH value decreased from 8.99 to 8.62 pH units. The conductivity was 2.3 μm/cm. Initial concentration of copper —11.4 mg/L. Copper content after electrocoagulation and filtration —0.30 mg/L. Test results are represented in Table 5.

TABLE 5

| Time, min | Current, A | Temperature, °C. | PH unit | Content of copper, mg/L |
|---|---|---|---|---|
| 0 | 36 | 20 | 8.99 | 11.4 |
| 7 | 53 | 82 | 8.62 | 0.30 |

Example 5 (Table.6) The same as in the example 4, duration of electrocoagulation—10 min. until the temperature reached 85° C. The current was increased from 30 A to 80 A. The pH decreased from 9.5 to 9.3 pH units. Initial copper content —120 mg/L, number of electrodes —3.

TABLE 6

| Time, min | Current, A | Temperature, °C. | PH unit | Content of copper, mg/L |
|---|---|---|---|---|
| 0 | 30 | 10 | 9.5 | 120 |
| 10 | 80 | 85 | .3 | 8.48 |

Example 6 (Table.7)

Subject of test—wastewater after etching of printed circuit boards

Testing was conducted with an industrial electrocoagulator with a capacity 450 L. Steel pipes 34 mm in diameter and 830 mm in length were used as electrodes. Number of electrodes 3 & 6. Electrodes were placed into plastic perforated pipes. Inter-electrode distance (side of equilateral triangle) was 200 mm. Electrode length-830 mm, working length of electrodes, taking into account water volume used for test, was 500 mm.

Voltage=380V, duration of electrocoagulation—from 8 to 22 min. (to a temperature 60°). Current was changed from 50 A to 95A. The pH value decreased from 8.88 to 8.52 pH units. Wastewater conductivity was 2.18 μm/cm. Initial concentration of copper-21.4 mg/L, copper content after electrocoagulation and filtration—from 0.36 to 2.4 mg/L. Test results are represented in table 7.

TABLE 7

| Time, min | Current, | Temperature, ° | , pH unit | Content of copper, mg/L |
|---|---|---|---|---|
| 0 | 50 | 4 | 8.88 | 21.4 |
| 8–22 | 100 | 60 | 8.5 | from 0.36 to 2.4 |

Thus, application of the suggested method and device for electroextraction of heavy metals from technological solutions and wastewater allows the achievement of the following technical results:

1. Acceleration of the purification process due to an increase in the rate of heavy metal electroextraction as a result of high voltage and high current consumption in purified solution as well as application on electrodes all three phases of three-phase alternating current of commercial frequency during the electrocoagulation process.
2. Increase of device productivity, downsizing of cleaning units and increase of cycle numbers during operating mode.
3. Decrease of nonproductive waste of electric power for heating of treated solutions.
4. Possible treatment of big volumes of wastewater and industrial waste water without excessive loss of electric power.
5. Three-electrode steel system (one-stack and two-stacks) with bipolar electrodes made of aluminum or duralumin scrap which continues to extract heavy metals from solution even after electric power is turned off.

6. The method allows the return of treated water for secondary purification in the same electrocoagulator.

7. The method provides high rates of filtration for deposits of ferrites, chromites, aluminates and hydroxysulfates of heavy metals.

8. Secondary water pollution with purifying reagents is excluded.

9. The sludge obtained as a result of electrochemical treatment is similar to a concentrate of ferrous and non-ferrous metals, which is suitable for secondary treatment in metallurgy and chemistry.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

What is claimed is:

1. A method for electroextraction of heavy metals from technological solutions and wastewater, comprising the following steps:
    a. supplying a solution having a medium or low concentration of heavy metals;
    b. passing the solution periodically through an electroreactor containing six steel fixed electrodes, which form two three-electrode stacks;
    c. applying three phase alternating current to the solution, wherein the electrodes of each stack are switched to all three phases of alternating current.

2. The method of claim 1, wherein the medium concentration is less than 10 g/L.

3. The method of claim 1, wherein the medium concentration is between approximately 1 g/L and approximately 5 g/L.

4. The method of claim 1, wherein the heavy metals include chromium-6.

5. The method of claim 1, wherein the low concentration is between 0.1 mg/L and 1.0 g/L.

6. The method of claim 1, wherein the current flows to only one three-electrode stack.

7. The method of claim 1, in which phases of three-phase current are connected in parallel to two three-electrode stacks.

8. The method of claim 7, in which phases of three-phase current are switched in parallel to each of two opposite electrodes.

9. The method of claim 7, in which phases of three-phase current are switched in parallel to each of two adjacent electrodes.

10. The method of claim 1, wherein the heavy metal is chromium-6.

11. The method of claim 1, wherein the three phase alternating current is pulsed.

12. The method of claim 11, wherein the time interval between pulses is different than the duration of the pulse.

13. The method of claim 11, wherein the duration of the pulses is selected from the group consisting of ½, ⅙, ​¹⁄₁₂ and ​¹⁄₃₆ seconds.

14. A method for electroextraction of heavy metals from technological solution and wastewater, comprising the following steps:
    a. supplying a solution having a medium or low concentration of heavy metals;
    b. passing the solution periodically through a multichannel electroreactor containing a plurality of concentric channels, the channels having steel fixed electrodes evenly spaced around the periphery of the channel and the electrodes configured to form a plurality of three-electrode stacks;
    c. applying three phase alternating current to the solution, wherein the electrodes of each stack are switched to all three phases of alternating current.

15. A device for electroextraction of heavy metals from technological solutions and wastewater, comprising:
    a. an electroreactor with six steel fixed electrodes evenly located along the periphery of the inside of the electroreactor and having an inter-electrode space,
    wherein the electrodes are adapted to be connected to three-phase alternating current in the form of two three-electrode stacks and the electrodes of each stack can be connected to all three phases of the, alternating current; and
    b. a bipolar aluminum electrode in the inter-electrode space (not connected to AC electrical current supply).

16. A device according to claim 15, wherein the fixed steel electrodes are adapted so that the electroreactor can operate with only one of the two three-electrode stacks.

17. A device according to claim 15, wherein the fixed steel electrodes are adapted to operate with the two three-electrode stacks in parallel.

18. A device according to claim 17, wherein the electrode stacks are adapted so that the parallel electrodes are opposite of each other.

19. A device according to claim 17, wherein the electrode stacks are adapted so that the parallel electrodes are adjacent to each other.

20. A device according to claim 15, wherein the aluminum bipolar electrode is made in a form of removable perforated container filled with aluminum or duralumin scrap.

21. A device according to claim 20, wherein the steel electrodes are made without isolating shells.

22. A device according to claim 20, wherein size of the pieces of aluminum or duralumin scrap is greater than approximately 10 mm.

23. A device according to claim 20, wherein the perforated container is made of a nonconductive heat-resistant plastic.

24. A device according to claim 20, wherein the perforated container is located a distance greater than approximately 40 mm from the steel electrodes.

25. A device according to claim 20, wherein the perforated container has holes are equal or less than approximately 5 mm in diameter.

26. A device according to claim 15, wherein the aluminum bipolar electrode is a single bulk piece of aluminum in inter-electrode space without a container.

27. A device according to claim 26, wherein each of the steel fixed electrodes is coaxially placed in an isolating perforated shell made of non-conductive material.

28. A device according to claim 27, wherein there is a gap between the steel electrode and the isolating shell and wherein the gap is approximately 10–20 mm (up to 40 mm?).

29. A device according to claim 15, wherein the aluminum bipolar electrode comprises a plurality of bulk pieces of aluminum in the inter-electrode space without a container.

30. A device according to claim 29, wherein each of the steel fixed electrodes is coaxially placed in an isolating perforated shell made of non-conductive material.

31. A device according to claim 15, wherein the steel fixed electrodes are evenly located along the periphery of the inside of the electroreactor at a distance greater than approximately 40 mm from the electroreactor wall.

32. A device according to claim 15, wherein the diameter of the steel electrodes is aprroximately 20–180 mm.

33. A device according to claim 15, wherein the steel electrodes are selected from the group consisting of secondary pipes, all-metal cylinders, rails, T-beams and other secondary products.

34. A device according to claim 15, wherein the electroreactor is cylindrical.

35. A device according to claim 34, further comprising a conical bottom and an outlet branch.

36. A device according to claim 15, wherein the electroreactor is made of a nonconductive material.

37. A device according to claim 36, wherein the nonconductive material is selected from the group consisting of a composite material, a heat-resistant fiberglass plastic, concrete and brick.

38. A device according to claim 15, further comprising a current controller for current pulsing in specified range for effective coagulation.

39. A device for electroextraction of heavy metals from technological solutions and wastewater, comprising:
   a. a multi-channel electroreactor having a plurality of concentric channels and an inter-electrode space;
   b. a plurality of steel fixed electrodes evenly located along the periphery of the inside of each of the channels, wherein the electrodes are adapted to be connected to three-phase alternating current in the form of three-electrode stacks and the electrodes of each stack can be connected to all three phases of the alternating current; and
   c. a bipolar aluminum electrode in the inter-electrode space.

40. A device according to claim 39, wherein individual three-electrode stacks can be operated independently of each other.

* * * * *

UNITED STATES PATENT AND TRADEMARK OFFICE
CERTIFICATE OF CORRECTION

PATENT NO. : 6,887,368 B2
APPLICATION NO. : 10/253546
DATED : May 3, 2005
INVENTOR(S) : Aron Mikhailovich Khalemsky et al.

It is certified that error appears in the above-identified patent and that said Letters Patent is hereby corrected as shown below:

On the Title page, item (73), the Assignee names should be:

Ural Process Engineering Company, Ltd., Yekaterinburg (RU); Fenix Technology International, Inc., Reston, VA (US): and Brookhaven Science Associates, Upton, NY (US).

Signed and Sealed this

Tenth Day of April, 2007

JON W. DUDAS
*Director of the United States Patent and Trademark Office*